UNITED STATES PATENT OFFICE.

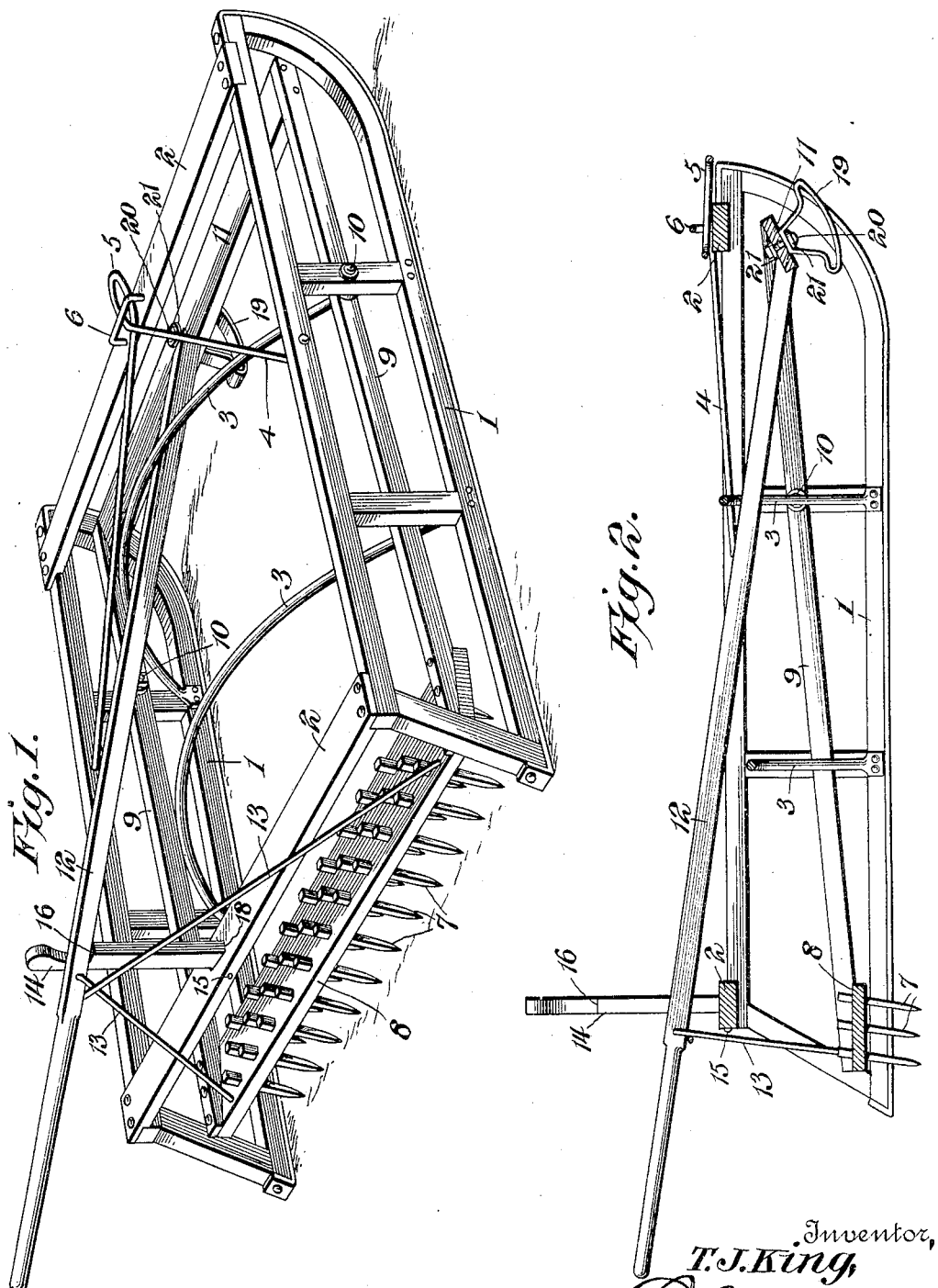

THOMAS JOEL KING, OF RICHMOND, VIRGINIA.

COMBINED WEEDER AND HARROW.

No. 810,154.  Specification of Letters Patent.  Patented Jan. 16, 1906.

Application filed October 17, 1905. Serial No. 283,152.

*To all whom it may concern:*

Be it known that I, THOMAS JOEL KING, a citizen of the United States, residing at Richmond, in the county of Henrico and State of Virginia, have invented a new and useful Combined Weeder and Harrow, of which the following is a specification.

The invention relates to improvements in combined weeders and harrows.

The object of the present invention is to improve the construction of harrows and to provide a simple and comparatively inexpensive one designed particularly for weeding and thinning out or chopping cotton-plants and capable of operating effectively on smooth and rough lands.

A further object of the invention is to provide a combined weeder and harrow of this character adapted to have its teeth readily adjusted to cut either shallow or deep at the will of the operator, for touching lightly soft places, so as not to cut deep enough to tear up all of the cotton, and also for applying the desired pressure in hard places in order that the work may be done properly.

Also the invention has for its object to provide a harrow in which the teeth may be lifted out of the soil either to throw the harrow out of operation or to clean the teeth of the same to prevent damage of young cotton-plants by the trash which constantly collects in front of the teeth.

Furthermore, it is the object of the invention to provide a harrow which will enable the operator when crossing a row of plants to cultivate the same at the sides and bottom as well as at the top in one operation.

With these and other objects in view the invention consists in the construction and novel combination and arrangement of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a combined weeder and harrow constructed in accordance with this invention, the harrow-teeth being supported above the ground. Fig. 2 is a longitudinal sectional view of the same, the harrow-teeth being arranged in position to operate on the soil.

Like numerals of reference designate corresponding parts in all the figures of the drawings.

The frame of the harrow is provided with a pair of runners 1, which are connected by suitable transverse bars and braces 2 and 3 and which may be constructed in any desired manner, as will be readily understood. The bars 2 extend across the frame of the harrow at the front and back thereof, and the intermediate braces 3 may consist of rods secured at their ends to the lower portions of the runners and arched to clear the plants; but any other form of intermediate brace or cross-bar may be provided. The runners enable the harrow to be readily drawn over the land under cultivation, and the draft-animals are suitably connected with the same by means of a draft attachment 4, provided with rearwardly-diverging sides and having a front loop 5, to which the whiffletrees are connected. The sides of the draft attachment are suitably secured to the frame of the harrow at opposite sides thereof, and the front portion of the attachment extends through a loop 6, which is mounted on the front transverse bar 2.

The harrow, while being adapted to be employed for all the purposes for which an ordinary harrow can be used, is designed particularly for thinning out and weeding cotton, and for this purpose it is drawn across the rows of plants either at right angles to the same or at an angle of forty-five degrees or thereabout, and in order to prevent the young plants under cultivation from being injured by the trash collecting in front of the harrow-teeth 7 the latter are mounted in a vertically-adjustable tooth-carrying bar 8. This vertical adjustment not only permits the trash collecting in front of the teeth to be readily discharged from the harrows, but it also provides for adjusting the harrow-teeth to cut at the desired depth, and it affords the operator perfect control of the harrow-teeth, so that all kinds of land, whether hard or soft or smooth or rough, may be properly operated on. When the land is soft, the harrow-teeth may be arranged to touch lightly the tops of the plants to prevent all the latter from being pulled from the soil, and when the harrow is passing over hard soil the teeth may be set at the desired depth to secure a proper operation of the harrow.

The harrow-teeth are suitably mounted in openings of the bar 8, which is substantially horizontal and which is preferably of a width to accommodate three rows of harrow-teeth; but any number of harrow-teeth may be readily understood. Also instead of providing rigid harrow-teeth, as illustrated in the accompanying drawings, the ordinary spring-tooth may be provided. In order to increase the capacity of the harrow, a tooth-carrying bar of any desired length may be employed, as the open runners will permit the bar to be extended through them. The tooth-carrying bar is mounted on and is raised and lowered by an oscillatory frame, which is provided with a pair of longitudinal levers 9, forming the sides of the oscillatory frame and connected at their rear ends by the transversely-disposed tooth-carrying bar. The rear ends of the levers are beveled or tapered and are bolted or otherwise secured to the tooth-carrying bar. The levers 9 are fulcrumed on the sides of the harrow-frame by means of horizontal bolts 10 or other suitable fastening devices, and the front ends of the levers are connected by a cross-bar 11, to which is secured the front end of an inclined operating-bar 12. The cross-bar 11 is fitted between the front ends of the levers 9, which are suitably fastened to the end edges of the cross-bar, and the latter is wide and heavy to partially counterbalance the tooth-carrying bar, and it may be of any desired weight to give the harrow a light or heavy touch. Its width will enable a weight to be readily secured upon it to weight the front portion of the oscillatory frame and lighten the touch of the harrow. The inclined operating-bar has its front end suitably secured in an opening or recess of the cross-bar 11; but it may be fastened to the same in any other desired manner, and the rear portion of the operating-bar is connected with a tooth-carrying bar by oppositely-disposed transversely-inclined rods 13, suitably secured at their lower ends to the tooth-carrying bar and connected at their upper ends to the operating-bar 12. The operating-bar in rear of the transversely-disposed rods 13 is shaped into a handle for the accommodation of the driver, and when two horses are employed for pulling the harrow a seat may be provided for the accommodation of the driver. The oscillatory frame may be swung on its pivot by raising and lowering the inclined operating-bar, which enables the operator to instantly change the position of the harrow-teeth to adapt the same to the character of the soil and throw the teeth into and out of operation and to discharge any trash collecting in front of it. When the harrow-teeth are thrown out of operation, as illustrated in Fig. 1 of the drawings, they are supported in such position by means of an upwardly-extending bar 14, pivotally mounted at its lower end by a pin 15 in an opening of the rear transverse bar 2 of the harrow-frame and provided at its upper portion with a shoulder 16 to receive the operating-bar 12. The shoulder 16 is formed by recessing the upper portion of the bar 14, which projects above the operating-bar and which is adapted to be readily swung into and out of engagement with the same. The opening 18 of the rear transverse bar 2 is of sufficient size to permit the necessary lateral movement of the supporting-bar 14 to swing the same into and out of engagement with the operating-bar 12. The end walls of the opening limit the movement of the supporting-bar 14, so that the latter is always in convenient position to be grasped by the operator. Any suitable means may be employed for limiting the downward movement of the tooth-carrying bar for preventing the teeth from being accidentally thrown too deep into the soil. The inclined operating-bar, which extends rearward beyond the frame of the harrow to enable it to be conveniently grasped by the driver while walking at one side or in rear of the harrow, is connected with the oscillatory frame both at the front and back, so that the frame and the harrow-teeth may be positively moved in either direction, and this will enable the desired pressure to be applied to the harrow-teeth for causing them to operate properly in hard soil, and the teeth may be held at the desired depth, so as to cultivate both the sides and the bottom of the beds.

In order to enable the harrow to be readily turned at the end of a row without destroying any of the cotton-plants, the oscillatory frame is provided at its front with a depending foot 19, which is pivotally connected at its top by a bolt 20 or other suitable fastening device to the front transverse bar 11 of the oscillatory frame. The foot, which is shown substantially triangular, may be of any preferred construction and it may be pivoted in any other desired manner. Suitable washers 21 and 22 are arranged on the bolt to prevent friction and wear of the parts. When the oscillatory frame is held in an elevated position by the upwardly-extending bar 14, the harrow-teeth and the foot 19 are both clear of the ground to enable the harrow to be readily drawn from one field or place to another. The foot is carried into contact with the ground by swinging the rear end of the lever 12 upward a short distance above the supporting-shoulder 16 of the bar 14. The harrow may then be balanced on the foot and will turn freely on the pivot of the same.

It will be seen that the combined harrow and weeder is exceedingly simple and inexpensive in its construction, that it is adapted for smoothing and pulverizing soil in the ordinary manner, and that in addition thereto it forms an effective chopper and weeder for thinning out cotton-plants, weeding corn, and the like. Also it will be clear that the harrow-teeth are under complete control of the operator at all times and that it may be readily raised and lowered to suit the character of the soil under cultivation and also to discharge any trash which may be accumulated in front of the teeth and to throw the harrow out of operation.

Having thus fully described my invention, what I claim as new, and desire to secure by Letters Patent, is—

1. In a harrow, the combination of a harrow-frame, an oscillatory frame disposed longitudinally of the harrow - frame and fulcrumed at an intermediate point, harrow-teeth carried by the rear portion of the oscillatory frame, and an operating-bar connected with the oscillatory frame in advance and in rear of the pivotal point thereof for raising and lowering the harrow-teeth.

2. In a harrow, the combination of a harrow - frame, an oscillatory frame provided with a pair of levers disposed longitudinally of the harrow-frame and pivoted to the same at an intermediate point, a tooth-carrying bar connecting the rear portions of the levers, and a longitudinally-disposed operating-bar arranged at an inclination and connected with the front portions of the levers and with the tooth-carrying bar.

3. In a harrow, the combination of a harrow - frame, an oscillatory frame provided with longitudinal levers, and a front cross-bar connecting the levers, the latter being pivoted at an intermediate point, a tooth-carrying bar connecting the rear ends of the levers, an inclined operating-bar secured at its front end to the said cross-bar, and means for connecting the rear portion of the operating-bar with the tooth-carrying bar.

4. In a harrow, the combination of a harrow-frame provided with runners, an oscillatory frame having a front cross-bar and provided with side levers fulcrumed at an intermediate point on the sides of the harrow-frame, an inclined operating-bar disposed longitudinally of the harrow and secured at its front end to the said cross-bar, inclined rods or bars connecting the rear portion of the operating-bar with the tooth-carrying bar, and a pivoted supporting-bar mounted on the harrow-frame and arranged to engage the inclined bar for holding the latter in an elevated position.

5. In a harrow, the combination of a harrow - frame, an oscillatory tooth - carrying frame, and a foot mounted on the oscillatory frame and arranged to support the harrow to permit the same to be readily turned at the end of a row.

6. In a harrow, the combination of a harrow-frame, an oscillatory frame fulcrumed at an intermediate point, harrow-teeth carried by the rear portion of the frame, and a foot arranged on the front portion of the frame for supporting a harrow to permit the same to be turned at the end of a row.

7. In a harrow, the combination of a harrow-frame, an oscillatory frame fulcrumed at an intermediate point and provided at the back with harrow-teeth, a pivotally-mounted foot carried by the front portion of the oscillatory frame, and operating means connected with the oscillatory frame.

8. In a harrow, the combination of a harrow-frame, an oscillatory frame fulcrumed at an intermediate point and provided at the back with harrow-teeth, a pivotally-mounted foot carried by the front portion of the oscillatory frame, and an operating-lever connected with the oscillatory frame.

In testimony that I claim the foregoing as my own I have hereto affixed my signature in the presence of two witnesses.

THOMAS JOEL KING.

Witnesses:
  C. W. WINN,
  L. L. NORVELL.